April 16, 1957  C. T. LINK, JR  2,789,067
STREET SWEEPING MACHINE WITH COMPACTING MEANS IN THE
DIRT BOX THEREOF AND A METHOD OF SWEEPING
Filed Oct. 12, 1950  7 Sheets-Sheet 2

Inventor
CHARLES T. LINK, JR.

by Hill, Sherman, Meroni, Gross & Simpson
Attys.

April 16, 1957

C. T. LINK, JR

2,789,067

STREET SWEEPING MACHINE WITH COMPACTING MEANS IN THE
DIRT BOX THEREOF AND A METHOD OF SWEEPING

Filed Oct. 12, 1950

Inventor
CHARLES T. LINK, JR.

by Hill, Sherman, Meroni, Gross & Simpson
Attys.

2,789,067

United States Patent Office 2,789,067
Patented Apr. 16, 1957

2,789,067

STREET SWEEPING MACHINE WITH COMPACTING MEANS IN THE DIRT BOX THEREOF AND A METHOD OF SWEEPING

Charles T. Link, Jr., Skokie, Ill., assignor to Elgin Sweeper Company, Elgin, Ill., a corporation of Illinois Application October 12, 1950, Serial No. 189,871

17 Claims. (Cl. 134—6)

The present invention relates to improvements in street sweepers and more particularly concerns the provision of novel means for compacting the sweepings which have been driven into the dirt box of the machine by the main sweeping broom.

An important object of the present invention is to provide improved means for periodically compacting the material in the dirt box of a street sweeping machine as sweeping progresses so as to increase the capacity of the machine between dumpings.

Another object of the invention is to provide a street sweeping machine dirt box compactor which is cyclically operable to compact the dirt while sweeping continues uninterruptedly.

A further object of the invention is to provide an improved combination dirt compactor and load ejector for a street sweeping machine.

Still another object of the invention is to provide an improved dirt compactor for street sweeping machines effectively operable with an efficient power input to work ratio.

Yet another object of the invention is to provide in an improved street sweeper compactor novel dirt box wiping structure.

A further object of the invention is to provide a method of compacting and ejecting sweepings during a sweeping operation.

According to the general features of the present invention there is provided in a street sweeping machine of the type having a dirt box and a broom operable to direct sweepings into the dirt box, a compactor ram operable cyclically while the street sweeper is in sweeping operation to engage the walls of the dirt box and drive the dirt therein away from the mouth of the box toward a thrust wall dump door.

According to other features of the invention novel means are provided for actuating the compactor ram.

Further features of the invention reside in novel wiper structure on the ram and also in an improved counterbalancing arrangement for the ram to avoid excessive wear upon the wiper structure.

Other objects, features and advantages of the present invention will be readily apparent from the following detailed description of a preferred embodiment thereof taken in conjunction with the accompanying drawings, in which:

Figure 1:
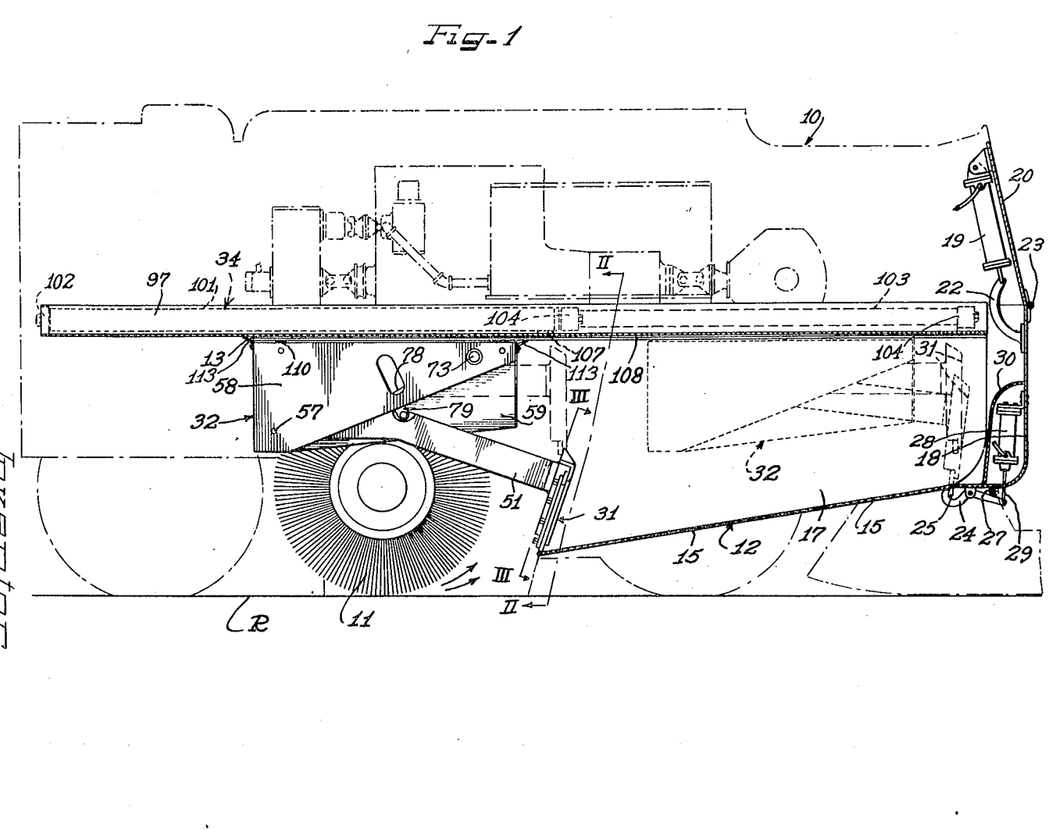
Figure 1 is a more or less schematic side elevational view of a street sweeping machine, partially in section, and showing a dirt box compactor assembly according to the present invention.

A street sweeping machine 10 with which the present invention is adapted to be used may be of any preferred construction including sweeping means such as a rotary sweeping broom 11 operable as the machine travels over a roadway R to impel sweepings as indicated by directional arrows in Fig. 1 into a dirt box 12. Street sweepers of this type are usually self-propelled under the control of an operator who rides with the machine.

Figure 2:
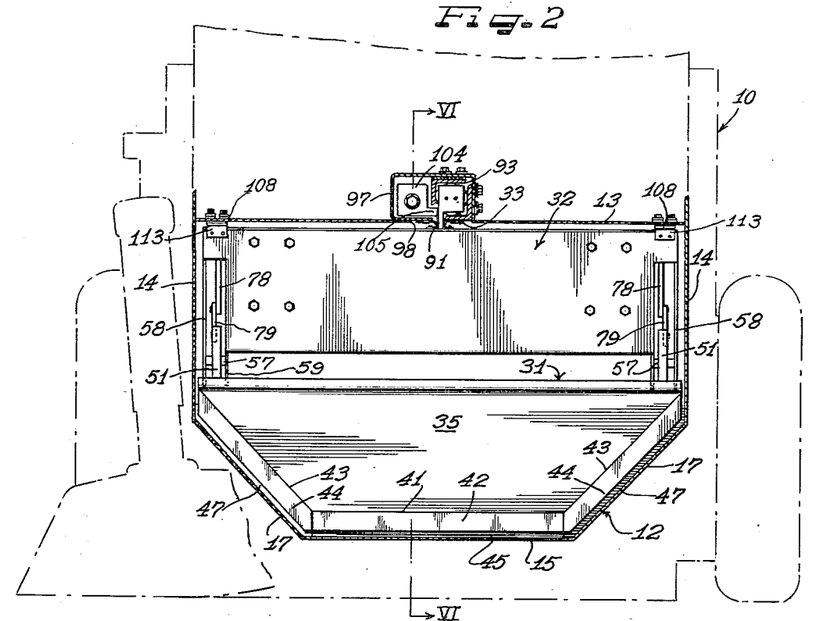
Figure 2 is an enlarged fragmentary sectional elevational view taken substantially on the line II—II of Fig. 1.
Figure 7:
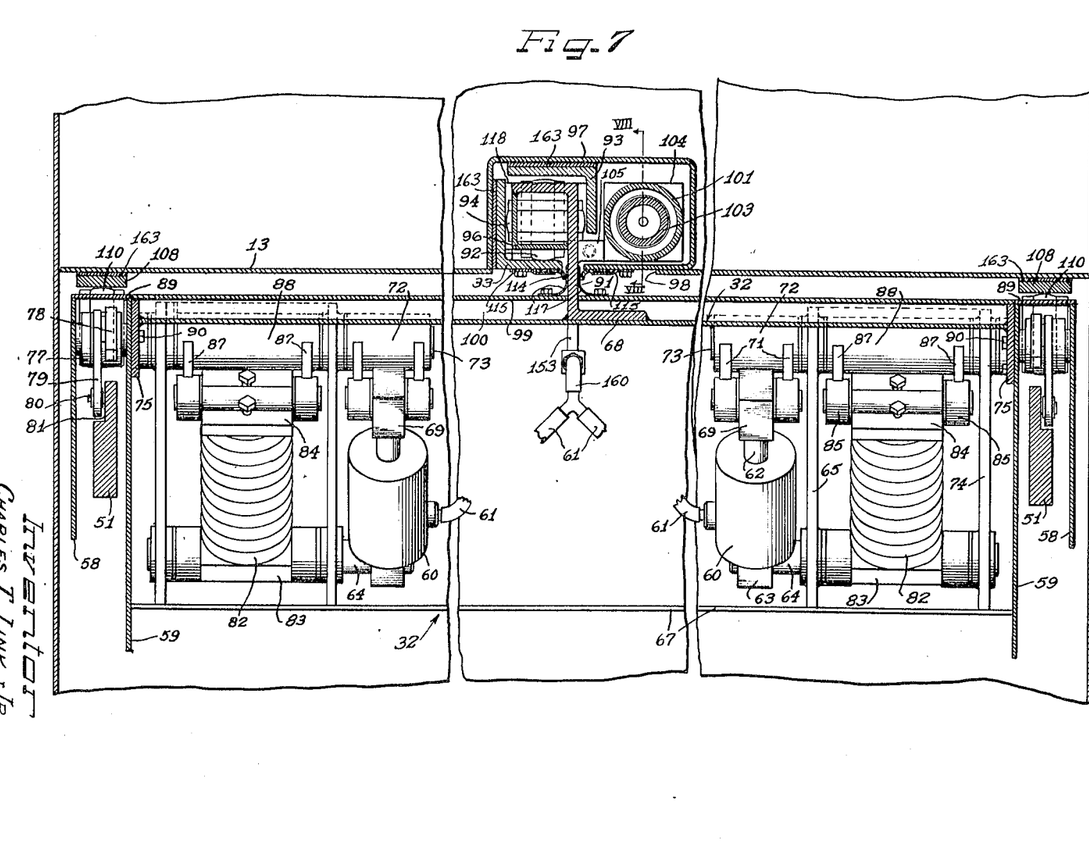
Figure 7 is a fragmental enlarged sectional detail view taken substantially on the line VII—VII of Fig. 6.

As shown in Figs. 1, 2 and 7, the sweeping apparatus and the dirt box 12 are located below a deck 13 disposed at a suitable elevation and also carrying thereabove the motor, transmission, and various operating apparatus, hydraulic mechanism and control devices of the machine.

By reference the dirt box 12 is of a width substantially equal to the body portion of the machine and has spaced side walls 14 and a bottom wall 15 which joins the side walls 14 through the medium of diagonal upwardly directed side portions 17 (Fig. 2). By preference the dirt box is disposed under the forward portion of the deck 13 and has at its rear end a large rearwardly opening dirt-receiving mouth adjacent to but spaced forwardly from the sweeping broom 11 to receive with maximum efficiency street dirt and debris swept up by the broom into the dirt box. From the mouth, the bottom wall 15 of the dirt box slants upwardly and forwardly to a discharge opening at its forward end closed by a dump door 18 which also serves as a thrust wall toward which the sweepings are driven.

Since it is necessary periodically to dump the contents of the dirt box 12, the dump door 18 is equipped to be opened but during sweeping operation of the machine to be held positively closed. For this purpose a hydraulic operator 19 of the cylinder and piston type is mounted on a front wall 20 of the machine body and has a piston rod 21 connected operatively to an arcuate arm 22 on the upper portion of the door adjacent to a horizontal door hinge 23. The door operator 19 is adapted to be actuated at the will of the machine attendant through suitable hydraulic means to swing the door 18 forwardly and upwardly for dumping the dirt box contents.

In order to hold the dump door 18 positively closed during sweeping, a pivoted latch hook 24 carried by the underside of the door is engageable with a fixed retainer 25 on the adjacent forward end of the lower wall 15 of the dirt box, a spring 27 being operative normally to bias the latch hook into the latching position. For releasing the latch hook when the door is to be opened, a hydraulic latch releasing actuator 28 is provided which is appropriately mounted on or within the dump door 18 and has a piston rod 29 attached to the lever end of the latch hook. The latch operator 28 is adapted to be operated in coordination with the door operator 19 and may comprise a one way hydraulic cylinder and piston arrangement, the spring 27 being relied upon to return the latch hook 24 to latching position after the door has been released for opening. A dirt shield 30 protects the latch operator 28.

According to the present invention, means are provided for compacting the sweepings propelled into the dirt box 12 by the broom 11 in order greatly to increase the capacity of the dirt box and thereby of the load capacity of the machine before dumping of the load is required. This is especially desirable where the material to be swept up comprises leaves and like bulky materials, although by the very nature of the sweeping operation even heavier materials such as sand, soil and other debris swept up from a street are flocculated by action of the sweeping broom 11 and thus normally tend to produce a rather porous, bulky mass in uncompacted condition in the dirt box.

Herein the compacting means comprise a ram 31 operative in the dirt box 12 (Fig. 1) supported and actuated by mechanism including a traveling carriage 32 running on an overhead track 33 (Figs. 2 and 7) and motivated reciprocably to travel back and forth in a front to rear direction by means such as a hydraulic operator 34.

Figure 3:
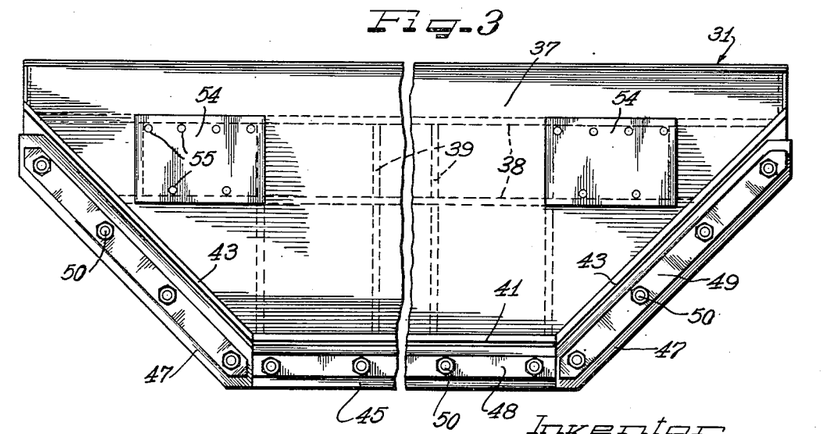
Figure 3 is a fragmental, enlarged rear elevational view of the compactor ram taken substantially along the line III—III of Fig. 1.

For maximum strength combined with minimum weight, the ram 31 is preferably formed from sheet metal plate such as suitable gauge steel stock comprising a ram face plate 35 (Figs. 2, 3 and 6) and a rear plate 37 with a buttress framework of horizontal connecting bars 38 and vertical connecting bars 39 disposed in lattice-like arrangement between the plates and secured thereto as by welding to provide a rigid unit. At its upper margin, the front plate 35 is turned back to provide a closure flange 40 which meets the upper edge of the back plate 37.

The lower margin of the ram 31 is conformed complementary to the shape of the bottom wall 15 of the dirt box. To this end, a central horizontal bar 41 is secured to the lower edge of the ram assembly and is preferably of angular cross section providing a forward downwardly extending flange 42. At each side the lower margin is provided with a reinforcing and dirt pushing bar section 43 disposed on a complementary diagonal angle to the side portions 17 of the dirt box. Each of the respective side bars 43 is also of angular cross section and has a forward downwardly projecting flange 44.

In order to minimize frictional resistance and wear, and to provide for positive though yieldable wiping action of the ram 31 on the bottom wall surfaces of the dirt box, appropriate wipers are carried by the respective flanges 42 and 44 of the lower marginal bar sections of the ram. In a desirable form, the wipers comprise a heavy horizontal wiper strip 45 carried by the horizontal marginal bar flange 42 and respective wiper strips 47 carried by the side bar flanges 44. By preference, the wiper strips are formed from heavy resilient rubber or rubber-like material of adequate thickness and wear resistant qualities for the present purpose. These wipers are so mounted on the carrying flanges of the ram that marginal portions of the wipers extend beyond the edges of the carrying flanges in complementary relation to the surfaces of the bottom wall sections of the dirt box to make wiping contact therewith.

In order to prolong the useful life of the wiper strips, provisions have been made to reverse the same, that is to present opposite longitudinal margins of the strips for wiping action. For this purpose means are provided for removably clamping the wiper strips to the respective supporting flanges of the ram. In a convenient construction such means comprise a clamping bar 48 for clamping the wiper strip 45 in place and respective clamping bars 49 for clamping the side wiper strips 47 in place, bolts 50 being provided for securing the clamping bars in place. Conveniently the bolts are tapped into the respective supporting flanges of the ram. It will be observed that to facilitate marginal reversal of the side wiper strips 47, the end angles thereof which conform the same to the shape of the ram as required by the shape of the dirt box bottom, are appropriately formed so that in reversing the longitudinal margins of the side strips, they must be turned end for end so that the ends which in one operative position of the side strips are at the sides of the ram, are in the other position or rather the alternative wiper edge position in contiguity to the ends of the intermediate or lowermost wiper strip 45. Through this arrangement a fairly clean wipe is provided for as the ram pushes material from the rear toward the forward portion of the dirt box and yet the wiper edges of the ram provided by the resilient wiper strips avoid undue resistance to relatively non-yielding material that may become stuck on the bottom of the dirt box, or imperfections or dents that may be present in the dirt box bottom wall. Furthermore the ram can be used for a long period continuously without requiring service attention. When the resilient wiper strips become unduly worn on one of their wiping edges, then it is a relatively simple matter to reverse the same to bring the opposite wiping edge into operating position without dismantling the compactor since the clamping bars 48 and 49 are readily accessible at the rear of the dirt box since they are positioned at the rear of the ram and the ram has its initial operating cycle position at the mouth of the dirt box.

The ram actuating mechanism comprises among other things a pair of ram arms 51 (Figs. 1, 6 and 7) disposed at respectively opposite sides of the ram 31 and fixedly but removably secured thereto. By reference the ram arms 51 comprise heavy vertically flattened bars provided with angular forward attachment flanges 52 which are secured as by means of bolts 53 to attachment blocks 54 (Fig. 3) secured in any appropriate manner as by welding to the rear or outer face of the rear plate 37 of the ram member and strongly bolstered by the internal grillwork of reinforcing bars of the ram. The attachment blocks 54 are, of course, provided with appropriately tapped bolt holes 55.

Each of the ram arms 51 is preferably of generally dog-leg shape and pivotally supported at the rear extremities by means of stub shafts 57 extending between and journaled in spaced parallel side wall panels 58 and 59 of the ram carriage. The space between the side wall panels of the carriage is ample to accommodate the ram arms 51 for vertical swinging movement between an upper inactive position of the ram as shown in full line in Fig. 6 and in dash outline in Fig. 1 and an active ramming position as shown in dash outline in Fig. 6 and full outline in Fig. 1.

Suitable means are provided for swinging the ram between its active and inactive positions. For lifting the ram, that is for swinging it from the active position into the upper inactive position, hydraulic mechanism is preferably used comprising a pair of hydraulic operators 60, that is an hydraulic operator for each of the arms 51, one of which will be described and it will be understood that the remaining operator and its transmission of power to the ram being substantially the same. The hydraulic operator 60 is of any preferred construction comprising a cylinder and piston arrangement with an appropriate hydraulic fluid supply and exhaust duct 61 leading thereto and with a motivated piston rod 62 projecting upwardly therefrom. At its lower end the hydraulic operator has an attachment boss or terminal 63 which is pivotally carried by a stub shaft 64 journaled in a vertical supporting plate 65 mounted on a front wall panel 67 of the carriage and having further attachment to an upper wall plate or panel 68 of the carriage.

Operative connection of the hydraulic operator 60 to the associated ram arm 51 is effected through the piston rod 62 which has a connecting head or eye 69 pivotally connected by a stub shaft 70 to a pair of spaced lever arms 71 integral with a hub 72 which is keyed to a shaft 73 journaled in the upper portion of the reinforcing vertical wall plate 65 and also in a similar vertical supporting and reinforcing plate 74 spaced outwardly from the reinforcing supporting plate 65 and disposed adjacent to the inner of the side wall panels or plates 59 of the carriage. The shaft 73 extends on outwardly through a downwardly extending supporting flange 75 welded onto the side edge of the top panel 68 and clears through the side wall panels 58 and 59 to extend through the space between the side wall panels. Attached to the portion of the shaft 73 which extends through the side wall panel space is a hub 77 rigidly keyed thereon and having projecting rearwardly therefrom an elongated lever arm 78 connected at its rear extremity portion to a downwardly extending short link 79 which in turn at its lower end is pivotally connected by means of a pivot pin 80 or the like to an intermediate portion of the associated ram arm 51 preferably within a recess 81 provided therefor in the arm at the upper portion of the juncture of the dog-leg portions of the ram arm.

By having the short lever arm 71 which is connected to the hydraulic operator appropriately angularly disposed, in the present instance extending downwardly and rearwardly obliquely from the shaft 73, and the lever arm 78 extending rearwardly on an angle more nearly approaching the horizontal, and with the substantial lever differential between the short lever 71 and the relatively long lever 78, upward and rearward thrust by the hydraulic operator causes swinging of the levers 78 and 71 through the transmission afforded by the shaft 73 and lifting of the ram arm 51 and thereby the ram 31 about the pivot 57 for the ram arm.

The hydraulic operator 60 may be only a one way operator, that is, supplied with hydraulic fluid under pressure for lifting the ram and with a free exhaust when the ram is to be lowered, since by having the ram 30 mounted on relatively long supporting arms 51 which are pivoted at their rear extremities, the force of gravity can be relied upon to lower the ram. Since the ram is necessarily of quite sturdy construction in order to withstand high impact loads and is therefore necessarily of substantial weight, it will be clear that the ram will descend into its active dirt pushing position promptly upon release of the hydraulic lifting force.

Figure 6:
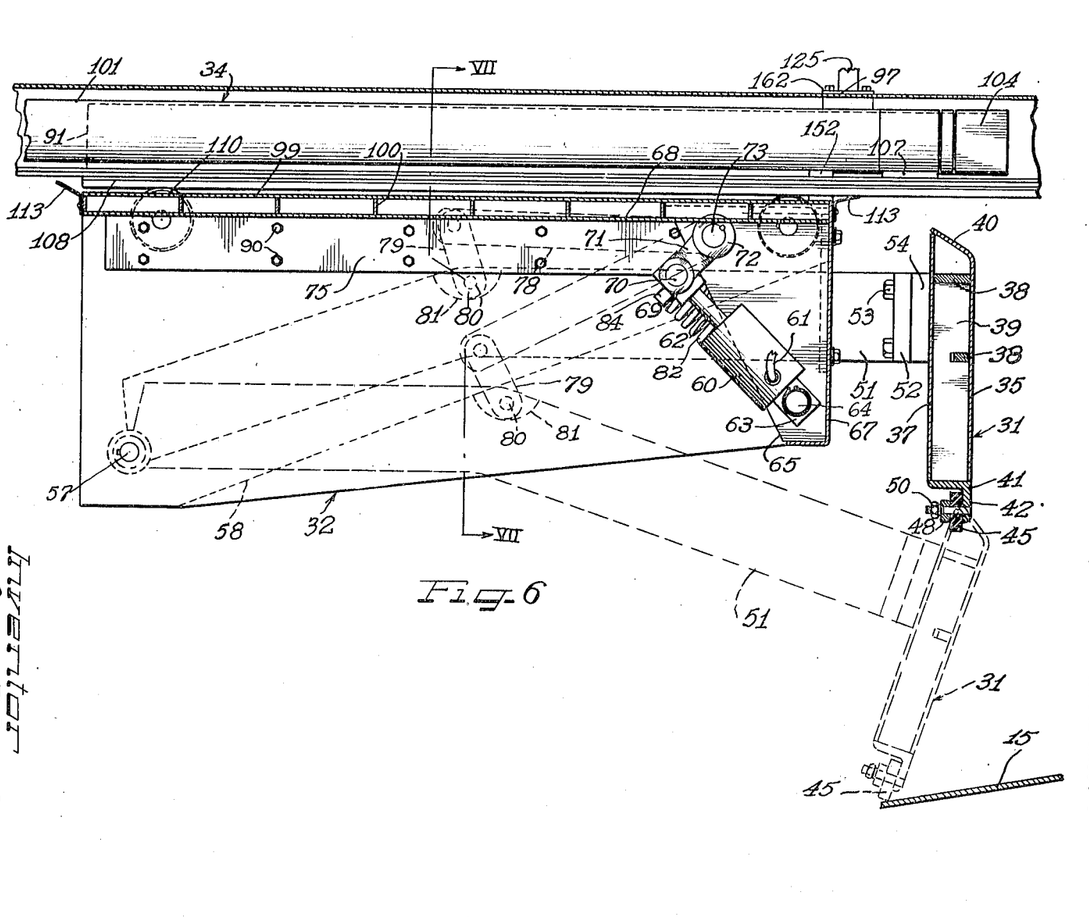
Figure 6 is an enlarged fragmentary sectional view taken substantially on the line VI—VI of Fig. 2.

In order to avoid undue ram load upon the wiper strips 45 and 47 when the ram is gravitationally in its active position with respect to the floor of the dirt box, means are provided for counterbalancing a substantial portion of the weight of the ram. In the present instance the counterbalancing means comprises a pair of coiled compression springs 82 which are of such weight or resiliency characteristics and length that in the active position of the ram they will support most of the weight of the ram. In a desirable relationship, the counterbalancing springs 82 will balance out all but a few pounds of the ram weight such as approximately 10 pounds so that only about 10 pounds pressure is applied to the wiper strips 45 and 47 during the dirt compacting operation. To this end, the counterbalancing springs are mounted at their lower ends upon respective platforms 83 pivotally supported by the stub shafts 64. At their upper ends the springs 82 are attached to compressor blocks or heads 84 which are pivotally carried between hubs 85 on short lever arms 87 extending from a hub 88 keyed onto the shaft 73 between the reinforcing plates 65 and 74. Thus, the springs 82 are mounted on axes which are generally parallel to the axes of the hydraulic operators 60 but are located between the reinforcing panels 65 and 74 of the carriage (Fig. 7). Through this arrangement, as the ram arms 51 drop to the active position with respect to the dirt box floor, the shafts 73 are rotated counterclockwise as seen in Fig. 6, and the arms 87 rigid therewith are similarly swung so as to apply compression to the springs 82 through the compression blocks or heads 84. The reaction of the springs 82 is to gradually take up the weight of the ram and thus counterbalance the same except for the few pounds pressure which is desirable against the wiper edges or strips on the ram. By having both the supporting bases and the compressor heads for the springs 82 pivotally mounted, deflecting torques or uneven pressure on the springs 82 is avoided.

As the ram 31 moves forwardly and gradually rises up the inclined bottom wall 15 of the dirt box, the counterbalancing springs 82, of course, elongate and progressively lose some of their counterbalancing force. However this loss in the force of the springs is compensated for and the ram pressure on the dirt box remains substantially constant throughout the full compacting stroke of the ram by reason of the construction and relationships existing in supplement to the size and characteristics of the springs, in the angle between the spring arms 87 and the longitudinal axes of the respective springs 82 at the beginning and also at the end of the forward or compacting stroke of the ram, the length of the ram lifter arms 78, the length of the connecting links 79, and the distance or spacing of the link pivot 80 from the pivot 57 of the ram arms 51.

In order to facilitate assembly with, and on the other hand facilitate disassembly or demounting of the ram from the carriage, the side wall plates 58 and 59 of the carriage are preferably secured together as generally inverted U-shaped units through the medium of top connecting or web plates 89. The side plate units thus provided are secured to the respective supporting flanges 75 through the medium of means such as bolts 90 (Fig. 7).

Figure 4:
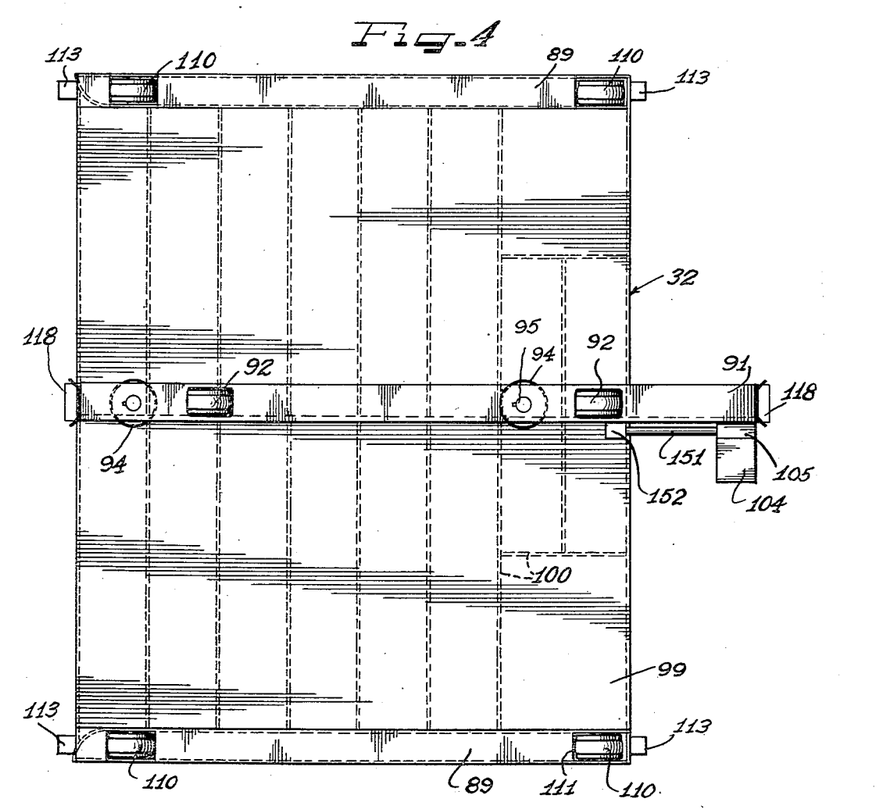
Figure 4 is a top plan view of the traveling carriage of the ram actuating mechanism.

In order to provide for reciprocal movement in a fore and aft direction of the carriage 32 along the overhead track 33, the carriage is supported by an overhead running wheel arrangement. Herein a monorail arrangement is provided wherein the rail 33 is supported by the sweeping machined deck 13 in a centered longitudinal position over the dirt box 12 and to a substantial distance rearwardly therefrom to afford an adequate range of fore and aft travel of the carriage. The rail 33 may comprise an angular section having a horizontal leg and a vertical leg, the horizontal leg providing a track. Secured to the longitudinal central portion of the upper or roof panel 63 is a hanger bar 91 of generally Z-shape having an upstanding web or leg that projects upwardly in service beyond the edge of the rail 33 and carries a longitudinally spaced pair of running wheels 92 which ride upon the rail 33. As best seen in Fig. 4, a pair of the running wheels 92 is provided, one located adjacent to each opposite end of the carriage 32.

Lateral guideway for retaining the carriage against lateral displacement from its track is provided by an angular guide member 93 running longitudinally parallel with the track member 33 and having a downwardly extending flange parallel with the upstanding flange of the track member and in spaced relation thereto and adapted to be engaged by vertical axis rollers 94 journaled on respective stub shafts 95 carried by and between the upper horizontal flange of the hanger bar 91 and a flange journal member 96 carried by the hanger bar 91 for this purpose. The guide bar 93 is supported by a longitudinally extending casing or housing 97 supported by the deck 13 over a longitudinally extending slot or aperture 98 in the deck upwardly through which the hanger bar 91 of the carriage extends.

In order to substantially reinforce the roof structure of the carriage 32 so as to withstand the weight of the several mechanisms in association with the ram as well as the ram itself, the roof structure comprises a substantially reinforced assembly attaining lightness in weight with maximum strength. To this end in addition to the roof plate 68, an upper coextensive plate 99 is provided in parallel spaced relation thereto, with a reinforcing bar network 100 comprising principally transverse spaced bars extending between the roof plates and welded thereto. The hanger bar 91 comprises a part of the reinforcing network by being secured fixedly and permanently as by welding to not only the plates 68 and 99 but also to the transverse frame bars 100. In addition, of course, the downwardly projecting side attachment flanges 75 provide substantial reinforcement for the sides of the carriage top structure.

Reciprocal motivation of the carriage 32 is effected by the hydraulic actuating cylinder structure 34 through the hanger bar 91 and for this purpose the cylinder structure is enclosed within the deck carried casing 97. As best seen in Figs. 1, 6 and 7, the actuating cylinder structure comprises a cylinder 101 which is secured at its rear end to a stationary block 102 at the rear end of the housing 97 while projectable from the forward end of the cylinder is a piston rod 103 having its forward end attached fixedly to an attachment block 104 secured fixedly as by welding of the lateral flange 105 on the block to the adjacent side of the hanger bar section 91 at the forward end portion of the latter. Sagging of the cylinder and piston rod in the extended condition of the piston rod is avoided by providing a pillow block 107 under the forward end portion of the cylinder. Motivation of the hydraulic operator 34 is accomplished through any preferred hydraulic system including appropriate controls under the direction of the driver of the sweeping machine.

Figure 5:
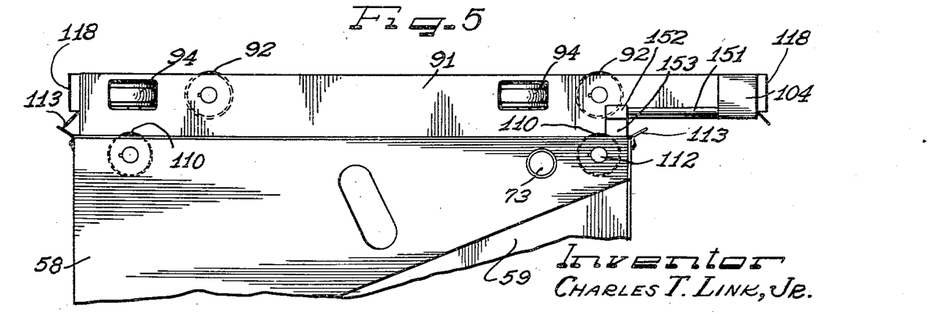
Figure 5 is a fragmentary side elevational view of the carriage.

Lateral tilting of the carriage 32 about the monorail axis is prevented by guide means in the form of respective rails 108 (Figs. 1, 2, 6 and 7) carried by the underside of the deck 13 adjacent to the opposite sides of the machine inside enclosing side walls 14 of the machine and overlying the detachable side wall structures of the carriage. Anti-friction means in the form of respective sets of rollers 110 spaced in front to rear direction at each side of the carriage and projecting up through appropriate apertures 111 in the top side structure frame plate 89 are engageable with the rails 108. The rollers 110 are appropriately journaled on stub shafts 112 (Figs. 4 and 5) carried by the side plates 58 and 59 of the carriage. In order to clean the rails 108 of dirt spattered thereagainst, scrapers 113 are preferably carried by the front and rear ends of the carriage and comprise flat spring members extending upwardly from the carriage into scraping engagement with the rails so that in the forward and rearward movements of the carriage, the scrapers will free the rails of materials splashed thereon.

Means are provided for not only substantially preventing entrance of sweeper splashings into the monorail housing 97, but also means for maintaining the rail or track members 33 and 93 clear of material that may nevertheless enter the housing and lodge on the rail surfaces of these members. To this end, cooperatively related flexible flap-type sealing or closure strips 114 are secured as by means of clamping strips 115 to the underside of the rail member 33 and the underside of the housing 97 at respectively opposite sides of the slot provided between the rail member and the housing underside for passage of the vertical leg of the hanger bar 91. By preference abutment strips 117 are secured at the respective opposite sides of the vertical leg of the hanger bar 91 for engagement by the lips of the closure strips 114, these abutment strips being formed of a smooth material to minimize friction. As the carriage 32 travels back and forth, the closure strips 114 flexibly accommodate the hanger rail 91 by spreading open as the rail passes and then close together fore and aft of the hanger rail for substantially preventing material from being splashed up into the monorail housing 97 through the lower clearance slot in the operation of the sweeper broom 11.

At the opposite ends of the box-like assembly provided by the upper portion of the hanger bar 91 and the flange journal member 96, flexible scrapers 118 (Figs. 4, 5 and 7) are provided engageable operatively with the track surfaces of the track members 33 and 93 in the travel of the carriage 32 for scraping the track surfaces of any possible deposits of foreign material that might interfere with free travel of the rollers 92 and 94 of the carriage monorail system. The material thus scraped off will eventually find its way downwardly through the hanger bar clearance slot in the monorail housing.

In view of the fact that the ram carriage 32 in operation moves through a relatively long stroke, a substantial problem is presented with regard to supplying the hydraulic ram-lifting operators 60 with motivating fluid. This is solved by the present invention through the expedient of utilizing the hydraulic pressure fluid supplied incident to operation of the hydraulic carriage operator 34. To this end, having reference to the diagrammatic showing in Figure 9, hydraulic fluid from a tank or sump 120 carried by the machine is pressurized by a pump 121 into a supply line 122. Pressure fluid is supplied from the line 122 through a control valve 123 alternately to a delivery duct 124 leading to the rear end of the cylinder 101 and a delivery duct 125 leading to the forward end of the cylinder 101, for driving a piston 127 on the piston rod 103 respectively forwardly in a ram compacting stroke and a return stroke. The control valve 123 may be of the plunger type including a piston or spool 128 reciprocable under the influence of pressure fluid operating against the ends thereof and supplied by respective delivery ducts 129 and 130 leading from a master valve 131 to which the pressure fluid supply duct 122 leads and which includes an operator such as a plunger or spool member 132 for controlling the delivery of pressure fluid alternately to the delivery ducts 129 and 130. The valve spool 132 may be equipped for either manual or automatic operating means, comprising a handle 133 carried by the spool 132 for manual operation and pressure fluid ducts 134 operative at the respective opposite ends of the valve spool for automatic or integrated pressure fluid operation in a system including other parts of the machine operating and control means which are not shown and which may be of any preferred form as is customary or preferred in sweeping machines of the type under consideration.

Figure 9:
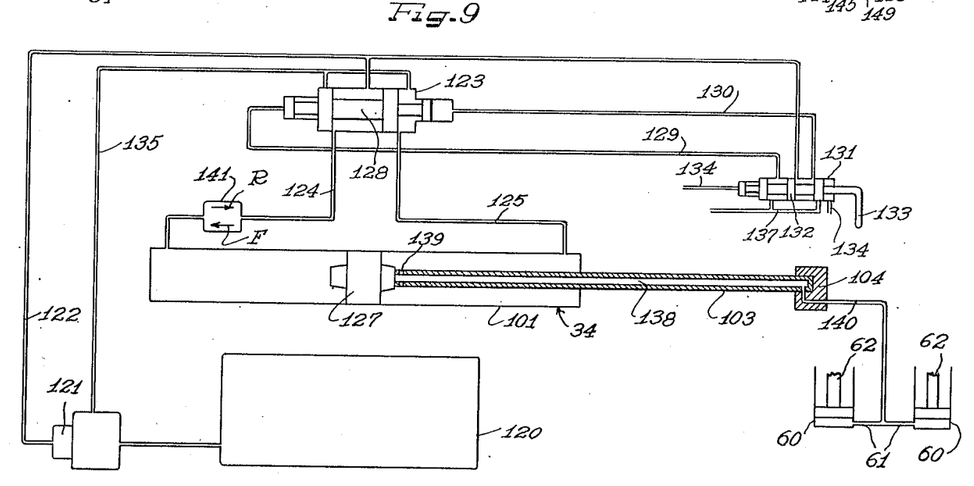
Figure 9 is a diagrammatic view of the hydraulic circuits involved in the operation of the hydraulic actuator and the ram lifting operators.

Hydraulic fluid exhaust lines or ducts 135 and 137 communicate with respectively the control valve 123 and the master valve 131.

Means are provided for utilizing the pressure fluid directed through the delivery line or duct 125 for effecting return stroke of the carriage-motivating piston 127 for supplying the hydraulic operators 60 with motivating pressure fluid. To this end the piston rod 103 is hollow to provide a passage 138 therethrough from an annular series of inlet ports 139 in the piston rod adjacent to the piston 127 to the forward end of the piston rod where through the medium of the thrust block 104 the passage 138 communicates with a pressure fluid delivery line or duct 140 connected to the hydraulic operator supply lines or ducts or conduits 61. Through this arrangement, the hydraulic operators 60 are operated coincident with and continuously in the return stroke of the ram and cause the ram to be lifted to its inactive position for the return stroke and maintain the ram in the lifted position throughout the return stroke and until the motivating pressure fluid is reversed for propelling the piston 127 forwardly to drive the ram carriage in a forward or compacting stroke. During the forward stroke, of course, hydraulic fluid is exhausted from the operators 60 by way of the duct 140 and the piston rod passage 138 out through the ports 139 into the forward end of the cylinder 101 and to exhaust through the delivery duct 125.

In order to assure lifting of the ram 31 before the carriage 32 begins its return travel, means are provided for imposing restraint upon return travel of the piston 127 during the initial phase of reversal of the hydraulic system. For this purpose a restrictor valve device 141 is interposed in the fluid delivery line 124 which permits free and substantially unrestricted flow of hydraulic fluid under pressure into the rear end of the cylinder 101 as indicated by the directional arrow F, while predetermined resistance to return or exhaust flow through the delivery duct 124 acting as a return line is interposed as indicated by the directional arrow R. This assures that upon reversal of the hydraulic system for returning the piston 127, adequate pressure will develop through the piston rod 103 to the hydraulic operators 60 for actuating the latter for lifting the ram in advance of or at least coincident with beginning of return movement of the ram carriage 32. This also assures that the hydraulic pressure for maintaining the operators 60 continuously operative to hold the ram elevated throughout the return stroke will be maintained through the return stroke of the carriage 32.

Figure 8:
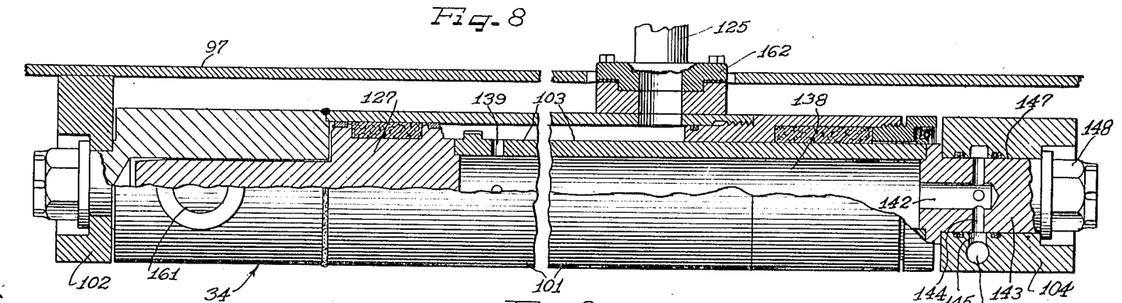
Figure 8 is an enlarged fragmental sectional view through the hydraulic actuator for the carriage taken substantially on the line VIII—VIII of Fig. 7.

In order to provide the actual mechanical means for accommodating the delivery duct 140 in the very limited clearance afforded through the hanger bar leg slot in the monorail housing 97, the duct 140 includes, at the end thereof which communicates with the passage 138 in the piston rod, an axial bore 142 which opens into a forward end plug and attachment boss 143 on the piston rod and communicates by way of series of radial ports 144 with an annular channel 145 on the inside of a bore 147 formed in the attachment block 104 and through which the boss 143 extends and is fixedly attached by means of a nut and washer assembly 148 (Fig. 8).

Figures 10, 11, 12:
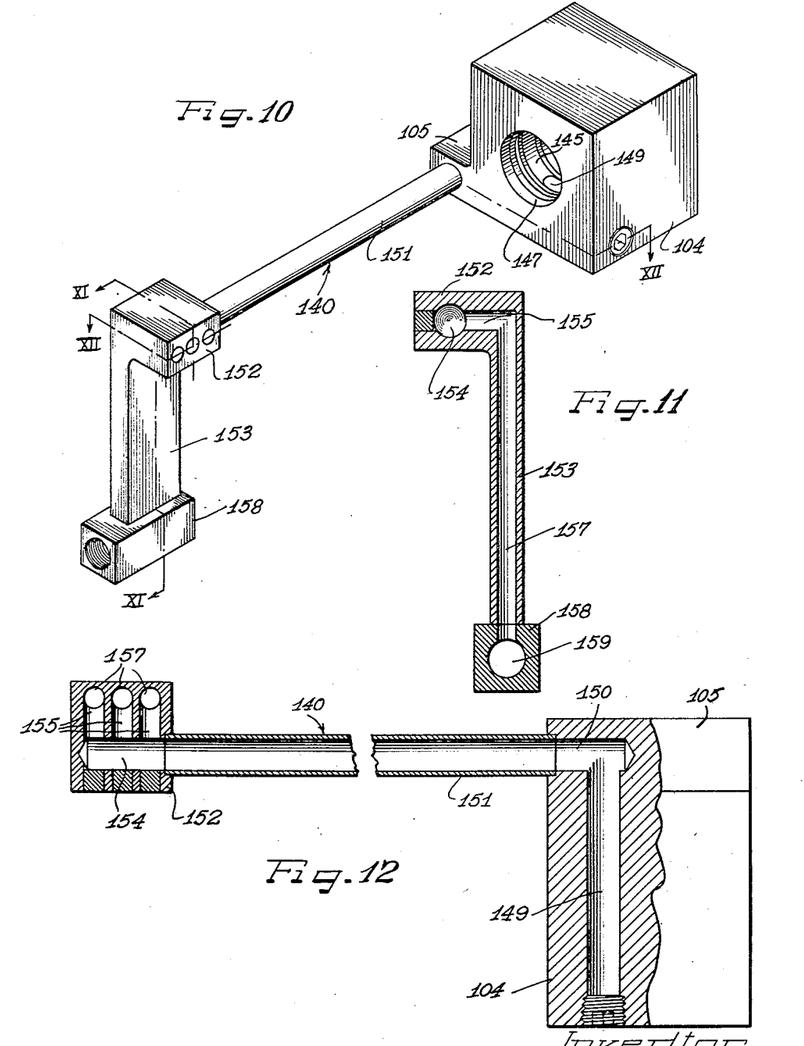
Figure 10 is an enlarged isometric view of the thrust block and associated fluid conducting duct means at the forward end of the hydraulic actuator of the apparatus.
Figure 11 is an enlarged vertical sectional view taken substantially on the line XI—XI of Fig. 10.
Figure 12 is a fragmental, enlarged horizontal sectional detail view taken substantially on the line XII—XII of Fig. 10.

From the internal annular fluid channel 145, leads a passage 149 provided by a transverse blind end bore in the block 104 (Figs. 8 and 12). The bore 149 extends into the lateral flange 105 on the attachment block and communicates with a lead off passage bore 150 into which is connected a pipe 151 (Figs. 4, 5, 10 and 12). The purpose of the pipe 151 is to afford a communicating portion of the duct 140 extending rearwardly from the block 104 to the front portion of the carriage 32 where the pipe is connected to a head flange 152 of a vertical flat adapter block member 153 having its major plane disposed vertically and in a front to rear direction. The thickness of the vertical portion of the block 153 is substantially the same as the thickness of the vertical leg of the supporting bar 91 (Fig. 7) and the member 153 is set into the vertical leg of the bar and depends therebelow into the space within the carriage under the top plate 68. A blind end bore 154 communicates with the pipe 151 and has a plurality of lead off passages or bores 155 which communicate with vertical bores 157 extending down through the vertical portion of the member 153. The plurality of bores 155 and 157 assures an aggregate cross sectional flow area sufficient to conduct the hydraulic fluid therethrough without developing undesirable back pressures in spite of the fact that the member 153 is necessarily quite thin so as to pass through the narrow slot clearance which accommodates the vertical leg of the bar 91. A connector base 158 at the lower end of the member 153 is of substantially larger cross sectional area and has a relatively large diameter blind end bore 159 with which the bores 157 communicate and which leads from the rear end of the base 158 for connection thereto of a delivery conduit 160 (Fig. 7) from which the ducts 61 lead off to the hydraulic operators 60. This arrangement provides a practical and sturdy hydraulic pressure fluid supply and exhaust fluid return system for the particular purposes of the present construction.

The supply duct 124 connects with the rear end portion of the cylinder 101 through a nipple 161 (Fig. 8) while the supply duct 125 communicates with the forward end portion of the cylinder through a nipple and connecting flange structure 162.

In order to minimize noise incident to vibrations that may be created in the travel of the carriage 32 back and forth on the monorail, respective vibration-absorbing or insulating strips or pads 163 are preferably interposed between the track members 33 and 93 and the walls of the monorail housing 97 to which the track members are respectively attached.

Also for sound deadening, resilient or at least vibration or sound absorbing or dampening strips 163 are disposed between the side guide rails 108 and the deck plate 13.

In the operation of the machine, dirt from a roadway being swept is continuously swept up into the dirt box 12. Periodically the ram 31 descends from its retracted, inactive position shown in dash outline in Fig. 1 and full line in Fig. 6, to the dash outline position shown in Fig. 6 and the full line position shown in Fig. 1 and the carriage 32 is then motivated forwardly to drive the ram 31 in its active position with respect to the floor 15 of the dirt box 12 until the ram has reached a limit of compaction, that is a limit of pressure into which the material compacted thereby may be pressed by the ram toward the thrust wall, dump door 18. Any preferred pressure limit mechanism may be employed in conjunction with the hydraulic operator 34 for this purpose.

When the ram has reached the limit of compaction as illustrated, for example, in the lower dash outline position at the forward end of Fig. 1, the ram is raised to the upper forward dash outline position as shown in Fig. 1 by action of the hydraulic actuator 60 and is then retracted through rearward movement of the carriage 32 by action of the hydraulic operator 34. This cycle is repeated as frequently as desired, depending upon speed of operation of the sweeping machine, and the nature and condition of the sweepings being picked up by the machine.

It should be noted that sweeping is not interrupted in the slightest for the purpose of compacting the contents of the dirt box. While the ram 31 is in its inactive position there is no interference with the delivery of sweepings into the dirt box. During the moment while the ram is lowered into the active compacting position wherein it engages and scrapes and wipes the material freshly swept into the dirt box forwardly toward compaction, there is so little interference with sweeping of material into the dirt box that any small amount of sweepings that may drop back onto the street are promptly picked up again by the continuously operating broom 11 and swept into the dirt box behind the ram 31. Then after the ram has reached the end of its compacting stroke, it is raised entirely out of the path of incoming sweepings and returned rearwardly in the elevated, inactive position for the beginning of another cycle of compacting action.

It will also be noted that while the rear or mouth portion of the dirt box 12 is of rather large area by reason of the low position of the floor of the dirt box at this point so that a large volume of loose material can be accommodated, the dirt box is smaller in area at the front by having the floor of the dirt box slope upwardly and forwardly. This can be accomplished because such a large mass of material can be accommodated in the dirt box by reason of the compacting action of the ram 31, so that what was a very large volume of flocculant sweepings at the mouth end portion of the dirt box becomes a very compact mass containing a large quantity of sweepings in very much reduced volume at the forward portion of the dirt box. As the ram moves forwardly and upwardly over the floor of the dirt box, the counterbalancing springs 82 and the advantageous compensating lever and link system of the ram supporting and motivating mechanism avoid undue pressure of the ram against the floor of the dirt box while full ramming pressure is maintained by the action of the ram against the dirt in the box.

After a sufficient quantity of dirt has been accumulated in compacted condition in the dirt box, the machine can be run to a dumping position or place or, if the service so requires, can be dumped at the position attained when full load is acquired. For this the thrust wall, dump door 18 is opened and the ram 31 of the compactor moved forwardly against the compacted mass of material in the dirt box for pushing the compacted mass out through the ejection opening at the front of the dirt box opened by swinging of the dump door 18 forwardly and upwardly by means of the hydraulic operator 19 after release of the latch 24. It will be observed on inspection of Fig. 1 that the compactor can move to the end of the dirt box floor at the front of the machine so that the full contents of the dirt box can be ejected by the ram. Immediately after the dirt box has been evacuated, the dump door 18 is returned to closed position and the latch 24 again holds it firmly closed to accommodate further compaction of dirt in the further service of the machine for repeating the sweeping operation.

It will be understood that modifications and variations may be effected without departing from the scope of the novel concepts of the present invention.

I claim as my invention:

1. In combination in a street sweeping machine of the type movable forwardly along a roadway to be swept, a rotary sweeping broom rotatable to sweep material forwardly in the forward travel of the machine, a dirt box located forwardly of the sweeping broom and having a dirt-receiving mouth adjacent to the broom, said dirt box providing a substantial dirt collecting chamber forwardly of the mouth and with a thrust wall at the forward end portion of the chamber, and means operable cyclically including a reciprocating compacting ram operable to and fro to travel from a position at the mouth of the dirt box to a position as close to said wall as the mass of material in the chamber permits to drive the sweepings into the dirt box forwardly in a compressed mass against said thrust wall, said compacting ram being movable rearwardly from the compressed mass at a substantial elevation above the floor of the dirt box and clear of the material entering the dirt box through the mouth of the dirt box by action of the sweeping broom in the continuous forward motion of the machine.

2. In combination in a street sweeping machine, means providing a deck at a substantial elevation, a sweeping broom operable under the deck to sweep forwardly in the forward movement of the machine, a dirt box located forwardly of the machine under the deck and having an open mouth adjacent to the broom to receive sweepings directly thereinto in the operation of the broom and a thrust wall at the forward end portion of the dirt box, and a compactor including a reciprocably mounted ram operable periodically to move forwardly and drive sweepings from the mouth portion of the dirt box forwardly into positive compacting relation against said wall while the broom continues to sweep additional sweepings into the dirt box behind the ram.

3. In combination in a street sweeping machine, means providing a deck at a substantial elevation, a sweeping broom operable under the deck to sweep forwardly in the forward movement of the machine, a dirt box located forwardly of the machine under the deck and having an open mouth adjacent to the broom to receive sweepings directly thereinto in the operation of the broom, a compactor including a reciprocably mounted ram operable periodically to move forwardly and drive sweepings from the mouth portion of the dirt box forwardly toward the forward portion of the dirt box while the broom continues to sweep additional sweepings into the dirt box behind the ram, and a dump door at the forward end of the dirt box having means thereon to hold the same closed in opposition to the compacting pressure of the compactor ram in driving material to be compressed toward and against the dump door, said dump door being openable for ejection of the compacted material under the thrust of the ram.

4. In combination in a street sweeping machine, supporting means adapted to be driven forwardly in sweeping a street, a broom operable continuously in the forward motion of the machine for sweeping the street, a dirt box disposed adjacent to the broom for continuously receiving sweepings directly thereinto from the broom, a reciprocable compactor including a ram operable periodically to drive sweepings from adjacent the mouth of the dirt box into a remote portion of the dirt box for compressing the sweepings, said ram having a wiping edge engaging the floor of the dirt box, and counterbalancing means for the ram for minimizing the pressure of the wiping edge against the dirt box floor.

5. In combination in a street sweeping machine, supporting means, a sweeping broom continuously operable in the forward motion of the machine along a street for sweeping up dirt therefrom, a dirt box disposed to receive sweepings from the dirt broom directly and continuously, and a compactor including a reciprocable carriage and a ram operable longitudinally in the upper portion of the dirt box, said ram comprising forwardly facing plate structure with arm means movably connected to the carriage and having a linkage connection between the carriage and the ram for dropping the ram within the mouth portion of the dirt box to the bottom of the dirt box for moving the ram away from said mouth by movement of the carriage to drive the dirt swept into the dirt box by the broom away from the broom and for compacting the dirt in a remote portion of the dirt box.

6. In combination in a street sweeping machine, supporting means, a sweeping broom continuously operable in the forward motion of the machine along a street for sweeping up dirt therefrom, a dirt box disposed to receive sweepings from the dirt broom directly and continuously, and a compactor including a reciprocable carriage and a ram operable longitudinally in the upper portion of the dirt box and having a linkage connection between the carriage and the ram for dropping the ram within the mouth portion of the dirt box to the bottom of the dirt box for moving the ram away from said mouth by movement of the carriage to drive the dirt swept into the dirt box by the broom away from the broom and for compacting the dirt in a remote portion of the dirt box, said carriage including driving means for reciprocating the same and also including means for motivating said linkage connection relative to the carriage for raising the ram at the end of a compacting stroke so as to return the ram above the incoming dirt within the dirt box as impelled thereinto by the broom.

7. In combination in a street sweeping machine, a forwardly acting sweeping broom, a dirt box disposed forwardly of the sweeping broom and having a dirt-receiving mouth forwardly adjacent to the broom, a track disposed at the roof of the dirt box, a carriage having means for suspending the carriage from and running upon said track so that the carriage is thereby movable reciprocably fore and aft within the upper portion of the dirt box, and a compacting ram carried by the carriage and movable up and down into and out of dirt box wiping position for moving sweepings from the mouth of the dirt box into the forward portion of the dirt box remote from said mouth to compact the sweepings.

8. In combination in a street sweeping machine, a sweeping broom, a dirt box for receiving sweeping from the broom, said dirt box having a floor therein extending from a mouth of the dirt box to a position remote from the broom, a reciprocable ram operable cyclically from a position at the mouth of the dirt box toward the remote portion of the dirt box and arranged to be elevated above the incoming dirt impelled in the dirt box by the broom during the return stroke of the ram, said ram having resilient wiping edge means thereon engageable with the floor of the dirt box, and counterbalancing means for minimizing the weight of the ram imposed by the ram against said edge means but nevertheless maintaining the edge means in wiping contact with the dirt box floor in the compacting stroke of the ram.

9. In a sweeping machine including a chassis carrying a broom for sweeping up dirt as the sweeper is being moved along the surface being swept, a dirt box on the sweeper chassis having at one end thereof an inlet mouth directly in the path of the sweepings for receiving same as the dirt is swept up by the broom, said dirt box having at its opposite end a wall facing toward said mouth, a compacting ram movable transversely of the box into the path of the sweepings at the mouth of the box while the broom is sweeping and means for moving the ram in a cyclically reciprocal path lengthwise of the box with start of the cycle at said mouth and movement in the direction of the sweepings toward said end wall for compacting against said end wall the dirt previously swept into the box by the broom and for thereafter moving the ram out of the path of the sweepings after each compacting operation and in return to said mouth so that additional dirt can be swept into the box toward the previously compacted mass.

10. In combination in a street sweeping machine, a mobile machine body including a dirt box having a mouth, a broom structure for sweeping street dirt into said box through said mouth, rail means on said body above said dirt box and broom structure, a carriage having means running on said rail means, a compactor carried by said carriage operable by running of the carriage along said rail means to compress dirt swept into the box by the broom structure, and scraper means carried by the carriage for keeping said rail means clear of dirt splashed thereagainst in the operation of the machine.

11. In combination in a street sweeping machine, a deck disposed at a substantial elevation, a dirt box below said deck, a broom for sweeping material into said dirt box, thrust wall means in said dirt box remote from but opposing said broom, ram carrying means operably supported under said deck, a ram supported by the carrying means and movable into and out of dirt compacting position relative to said wall means in the dirt box, and means comprising a hydraulic operator for actuating the carrying means and thereby moving the ram in dirt compacting and return strokes in the dirt box.

12. A method of compacting sweepings in the dirt box of a street sweeping machine including a broom operative continuously in the forward movement of the street sweeping machine for driving swept up dirt directly into the mouth of a dirt box, which comprises periodically moving the swept up dirt by successive increments from the mouth portion of the dirt box toward a remote portion of the dirt box while sweeping continues uninterruptedly, compressing the successive increments of dirt into a compacted mass toward and against a thrust wall in said remote portion of the dirt box, and periodically opening said thrust wall and ejecting the compacted mass from the dirt box through the opening thus provided.

13. In combination in a street sweeping machine, a mobile machine body including a dirt box having a mouth, a broom structure for sweeping street dirt into said box through said mouth, rail means on said body above said dirt box and broom structure, a carriage having means running on said rail means, and a compactor carried by said carriage operable by running of the carriage along said rail means to compress dirt swept into the box by the broom structure.

14. In combination in a street sweeping machine, a dirt box having a mouth, a top wall, a sweeping broom operable to direct sweepings into the mouth of the dirt box, said top wall having a longitudinal slot therein, a supporting rail above said wall adjacent to said slot, a reciprocable carriage in the upper part of the dirt box under said wall, supporting means extending from the carriage through said slot and supportingly engaging said rail, and a sweepings compactor supported operably by said carriage and operable upon movement of the carriage as suspended by said rail away from said mouth to compact the sweepings and the compactor being returnable to the mouth of the dirt box by return movement of the carriage.

15. In combination in a street sweeping machine, a dirt box having a mouth, a sweeping broom for directing sweepings into the mouth of the dirt box, a rail structure above the dirt box extending longitudinally, a reciprocable carriage supported by said rail means, a ram supported by said carriage and operable in the reciprocations of the carriage to drive sweepings away from the mouth of the dirt box and compact the same at the opposite end of the dirt box, and means for reciprocating the carriage comprising a piston and cylinder structure mounted above the dirt box parallel to said rail structure.

16. In combination in a street sweeping machine, a dirt box having a mouth, a sweeping broom for directing sweepings into the mouth of the dirt box, a rail structure above the dirt box extending longitudinally, a reciprocable carriage supported by said rail means, a ram supported by said carriage and operable in the reciprocations of the carriage to drive sweepings away from the mouth of the dirt box and compact the same at the opposite end of the dirt box, means for reciprocating the carriage comprising a piston and cylinder structure mounted above the dirt box parallel to said rail structure, and hydraulic means carried by the carriage and operable for lifting the ram into inactive position on return movement of the carriage, said hydraulic means having an operating hydraulic fluid connection with said cylinder and piston means.

17. In a street sweeping machine having a dirt box with a thrust wall at one end and a sweeping broom structure for sweeping dirt into the dirt box at the opposite end, dirt compacting means operable to and fro in said dirt box from adjacent said opposite end of the dirt box to a thrust limit close to said wall for thrusting with substantial compacting force against said wall successive incremental deposits of sweepings delivered into the dirt box by said broom structure, and means for opening said thrust wall for ejection through the opening thus provided of a compacted mass of sweepings.

References Cited in the file of this patent

UNITED STATES PATENTS

| | | |
|---|---|---|
| 457,586 | Hagarty | Aug. 11, 1891 |
| 876,727 | Pevey | Jan. 14, 1908 |
| 1,028,404 | Trabue | June 4, 1912 |
| 1,177,561 | Wyborski | Mar. 28, 1916 |
| 1,224,349 | Yessne | May 1, 1917 |
| 1,297,694 | Kindling | Mar. 18, 1919 |
| 2,046,679 | Furstnow | July 7, 1936 |
| 2,091,519 | Noyer | Aug. 31, 1937 |
| 2,189,859 | Evans | Feb. 13, 1940 |
| 2,263,199 | Wachter et al. | Nov. 18, 1941 |
| 2,286,245 | Wilson et al. | June 16, 1942 |
| 2,287,924 | White | June 30, 1942 |

FOREIGN PATENTS

| | | |
|---|---|---|
| 909 | Great Britain | 1915 |